United States Patent [19]
Montag et al.

[11] Patent Number: 5,926,401
[45] Date of Patent: Jul. 20, 1999

[54] WEATHER EFFECTS GENERATOR FOR SIMULATION SYSTEMS

[75] Inventors: Bruce C. Montag; Dennis J. Wenzel; Richard P. Weyrauch, all of San Antonio, Tex.

[73] Assignee: Southwest Research Institute, San Antonio, Tex.

[21] Appl. No.: 08/789,565

[22] Filed: Jan. 28, 1997

Related U.S. Application Data

[63] Continuation of application No. 08/342,103, Nov. 18, 1994, Pat. No. 5,598,359, which is a continuation-in-part of application No. 08/145,761, Oct. 29, 1993, Pat. No. 5,409,379.

[51] Int. Cl.$^6$ ................................................ G06F 9/455
[52] U.S. Cl. .................................. 364/578; 382/154
[58] Field of Search ........................... 434/2, 29; 342/26; 364/578, 420, 443; 345/500, 122; 382/154, 1

[56] References Cited

U.S. PATENT DOCUMENTS

| | | | |
|---|---|---|---|
| 3,826,864 | 7/1974 | Paufve | 178/6.8 |
| 4,016,658 | 4/1977 | Porter et al. | 35/12 N |
| 4,199,875 | 4/1980 | Barbarasch | 35/12 N |
| 4,313,726 | 2/1982 | Chase | 434/42 |
| 4,493,647 | 1/1985 | Cowdrey | 434/2 |
| 4,667,199 | 5/1987 | Roberts | 342/169 |
| 5,135,397 | 8/1992 | Yen | 434/2 |
| 5,227,898 | 7/1993 | Iavecchin et al. | 359/9 |
| 5,259,037 | 11/1993 | Plunk | 382/1 |
| 5,359,526 | 10/1994 | Whittington et al. | 364/443 |
| 5,363,475 | 11/1994 | Baker et al. | 395/122 |
| 5,379,215 | 1/1995 | Kruhoeffer et al. | 364/420 |
| 5,409,379 | 4/1995 | Montag et al. | 434/2 |
| 5,474,453 | 12/1995 | Copperman | 434/29 |
| 5,480,305 | 1/1996 | Montag et al. | 434/2 |
| 5,572,635 | 11/1996 | Takizawa et al. | 395/126 |
| 5,598,359 | 1/1997 | Montag et al. | 364/578 |
| 5,630,718 | 5/1997 | Montag et al. | 434/2 |

FOREIGN PATENT DOCUMENTS

| | | | |
|---|---|---|---|
| 4358291 | 12/1992 | Japan | G06F 15/72 |
| 9118359 | 11/1991 | WIPO | G06F 15/72 |
| 9119280 | 12/1991 | WIPO | G09B 9/34 |

OTHER PUBLICATIONS

European Search Report for Application No. 95900474 dated Jan. 21, 1997.

*Primary Examiner*—Kevin J. Teska
*Assistant Examiner*—Dan Fiul
*Attorney, Agent, or Firm*—Baker & Botts, L.L.P.

[57] ABSTRACT

A weather effects generator that generates weather data based on real-world weather data, and provides this data to a host simulator. The type of data provided and the spatial distribution of the data depend on the type of simulation. A real world database is accessed to obtain a dataspace of weather data elements, each having a location parameter and various weather-related parameters. For visual display simulators, the data elements are preprocessed to obtain color, transparency, and texture values for each data element. The preprocessed data elements are further processed to obtain a prioritized display list of those data elements that correspond to field-of-view data provided by the simulator. Each data element in this list is assigned a graphics primitive that can be rasterized in accordance with the color and transparency values. Simulators other than visual display simulators provide location data and receive data representing the weather effects at that location.

21 Claims, 6 Drawing Sheets

WEATHER EFFECTS GENERATOR FOR SIMULATION SYSTEMS

CROSS-REFERENCE TO RELATED APPLICATION

This application is a continuation application of U.S. application Ser. No. 08/342,103 now U.S. Pat. No. 5,598,359 filed Nov. 18, 1994 entitled *Weather Generator for Simulation Systems* by Bruce C. Montag, Dennis J. Wenzel and Richard P. Weyrauch, which is a continuation-in-part of U.S. application Ser. No. 08/145,761 now U.S. Pat. No. 5,409,379 filed Oct. 29, 1993 entitled *Weather Simulation System*.

TECHNICAL FIELD OF THE INVENTION

This invention relates to weather simulation, and more particularly to a weather effects generator that generates a weather database from real world weather data and prepares the data for use by a simulator.

BACKGROUND OF THE INVENTION

Weather simulation is often associated with visual displays used for aircraft flight training. Such systems typically provide "out-the-window" cockpit displays of the terrain that would be seen during actual flight. In addition to terrain, an enhancement to flight training systems is the simulation of weather conditions as part of the out-the-window display. Other applications, such as weather reporting, might also use computer-generated weather displays.

In addition to providing visual displays of weather conditions, weather simulation can be used in other simulation systems. For example, a simulation of a structural design might include the effect of wind on the structure. Or, a simulation of flight instrumentation might include a display of the output of weather radar.

Most existing simulation systems use computer-generated weather data. However, U.S. Pat. Ser. No. 08/326601, entitled "Weather Simulation System", by Montag, et al, and assigned to Southwest Research Institute, describes the use of real-world weather data in a simulation system. Three-dimensional weather data is obtained from real-world sources such as that detected by radar or satellite instrumentation. This source data is processed so that it can be coordinated with simulation data of a simulation system. For example, in the case of a flight training system, the aircraft can be located in a scene that illustrates real-world weather conditions.

SUMMARY OF THE INVENTION

One aspect of the invention is a weather effects generator that provides weather data to a simulator, with the weather data being based on real-world weather data. In first application, the weather data is for use by an image generator that provides a visual display of weather conditions. In a second application, the weather data is for use by a sensor display simulator. In a third application, the weather data is for use by a simulator of an observed object affected by the weather. The weather data can also be provided to a multi-function simulator that performs any combination of these applications.

Thus, one aspect of the invention is a method of providing data to an image generator that generates a three-dimensional infrared image. A real-world weather database is accessed to obtain a three-dimensional set of data elements. Each data element has at least a location value, a liquid water content value, and a temperature value. The data elements are culled to determine which are within a field-of-view, to obtain a set of field-of-view data elements. Then, the field-of-view data elements are sorted to form a list of data elements in depth order. A graphics primitive is assigned to each field-of-view data element. The graphics primitives associated with the frontmost data elements are used to cover an image plane, such that a certain percentage of the image plane is covered. This covering step is repeated, using graphics primitives in front to back order, until the image plane has been covered a predetermined number of times or until a predetermined number of field-of-view data elements have been used. The field-of-view data elements are then assigned to one or more depth bins on the basis of the results of the covering step, so as to generate a prioritized display list.

For simulators having a moving field-of-view or a changing location, the source data is processed on an "as needed" basis, so that only the weather within a current field-of-view or location is processed. Various preprocessing and data handling tasks minimize the amount of data to be processed so that real time displays can be generated without significant impact to the simulator's timing or sizing characteristics.

DETAILED DESCRIPTION OF THE INVENTION

Figure 1A:
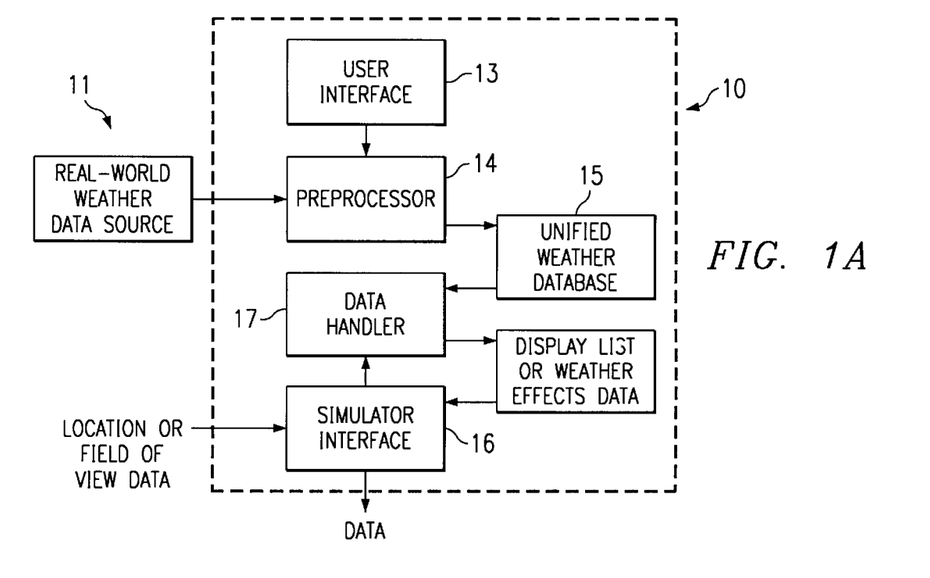
FIG. 1A is a block diagram of a weather effects generator in accordance with the invention.

FIG. 1A is a block diagram of the processing and data storage components of a weather effects generator 10 in accordance with the invention. In general, weather effects generator 10 uses source data from a real-world weather data source 11 to generate data that can be used to display weather conditions or to simulate weather effects. The components of weather effects generator 10 reside in the memory of a computer system, and when executed, implement the method of the invention.

Weather effects generator 10 is especially suitable for providing weather data to a host simulator. The particular characteristics of the data and the spatial distribution of the data depending on the type of simulation that is to be performed.

Figure 1B:
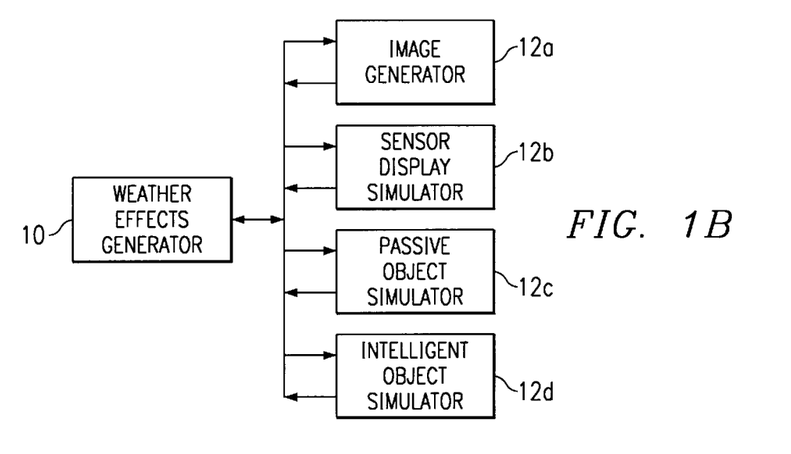
FIG. 1B is a block diagram of the various simulators with which the weather effects generator of FIG. 1 may be used.

FIG. 1B illustrates various types of host simulators with which weather effects generator 10 may be used. Referring to both FIGS. 1A and 1B, these include four general types of host simulators 12a–12d. Each simulator 12a–12d receives appropriate data from weather effects generator 10 and performs the functions required to use the data for display cues.

A first type of host simulator is an image generator 12a. Such a simulator 12a is described in U.S. Pat. Ser. No. 08/326601, entitled "Weather Simulation System", incorporated by reference herein. This patent application describes the structure and operation of a weather simulator for illustrating the weather of a scene perceived in visible light. A specific example of image generation is an "out-the-window" display of the weather as viewed from the cockpit of a simulated aircraft. A flight simulator receives weather data from weather effects generator 10 and generates a realistic display of clouds, fog, brightness, and other weather conditions. Another example of image generation is a simulation of an infrared display. For image generators 12a, weather effects generator 10 provides a prioritized display list representing real-world weather conditions.

An example of a sensor display simulator 12b is a radar display simulator. For this type of simulator, weather effects generator 10 provides a display list of water content values having an azimuthal spatial distribution corresponding to the radar's range scale.

An example of a passive object simulator 12c is a mechanical design simulator that creates a model of a structure such as a bridge or a tower that will be exposed to weather conditions. For the simulation system, weather effects generator 10 provides data representing weather conditions that are currently acting on the structure. Thus, the data is spatially distributed according to the current location of the object.

An example of an intelligent object simulator 12d, is an autonomous object simulator that simulates the behavior of a moving object that makes decisions about trafficability conditions such as muddiness or water inundation. For this type of simulator, weather effects generator 10 provides the same sort of data that is provided to the passive object simulator 12c and also provides trafficability data.

A feature of the invention is that weather effects generator 10 may simultaneously provide weather data to a host simulator that has multiple simulation subsystems. In this case, the simulation subsystems would be one or more of the various types of simulators 12a–12d. In other words, multiple simulators 12a–12d can be coordinated with respect to weather conditions and effects. For example, a flight training system might have all four types of simulators 12a–12d. The pilot could view an out-the-window display of the weather. He might also use an instrumentation panel with a weather radar display. His aircraft could be subjected to weather conditions such as wind, and he could be required to contend with other aircraft whose behaviors are modeled as autonomous agents. Weather effects generator 10 generates a weather database from which it obtains appropriate data for each type of subsystem. The type of data and the spatial distribution of the data varies according to the type of simulation.

Another feature of the invention is that weather effects generator 10 may provide data in the environment of moving as well as stationary objects. For example, an image generator 12a might illustrate the weather from an aircraft in flight or from a fixed viewpoint. Likewise, a sensor simulator 12b might simulate a sensor on a moving object or from a fixed location. The passive or intelligent objects of simulators 12c and 12d could be in motion or stationary. In each case, the weather environment changes with time or with location, or with both. As the weather changes, weather effects generator 10 updates the data it provides to the simulator.

Often it is desirable for weather effects generator 10 to provide its weather data to the host simulator 12a–12d so that real time motion can be depicted. An advantage of the invention is that it permits such real-time rendering of weather effects. The embodiment of this description assumes a real time display data rate of at least 30 frames per second. However, in other embodiments, single images or slower than real-time displays could be useful.

Figure 2:
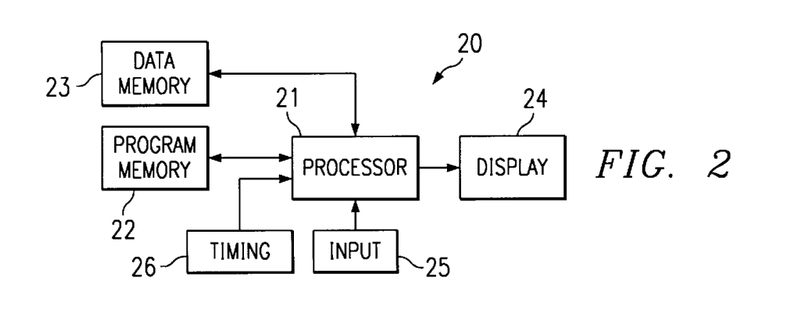
FIG. 2 is a block diagram of a computer system for implementing the weather effects generator of FIG. 1 and for executing the method of the invention.

FIG. 2 is a block diagram of a computer system 20 for implementing weather effects generator 10 and for performing the method of the invention. In general, the components of system 20 are conventional computer components, and include a processor 21 for executing instructions for the interface, preprocessor, and data handler functions of FIG. 1A. Although FIG. 2 is a system having a single processor for performing the functions of each processing component, the system could be physically as well as functionally divided into separate processing components. A program memory 22 stores program code. A data memory 23 stores data, and includes a mass memory for storing weather database 15. The system also has a graphics display 24 and an input device, such as a keyboard 25. A timing unit 26 provides timing signals for real-time displays. The present invention relates to the use of a computer system, such as that of FIG. 2, which stores and executes programming for weather effects generator 10.

Referring again to FIG. 1A, weather database 11 stores data representing real-world weather conditions. This data is "real world" data in the sense that it represents changing weather conditions as they actually occurred in a real-world environment.

More specifically, database 11 is a three-dimensional collection of data elements, each data element representing a volume of airspace. Each data element has a set of weather values, each representing a different parameter. One parameter is three dimensional location. The other parameters may be one or more of the following weather parameters:

wind speed (x,y,z) (kts)
    location (x,y,z) (ft)
    radar reflectivity (DBz)
    pressure (mB)
    temperature (K)
    water type (fog, hail, rain, snow, etc)
    liquid water content (g/m$^3$)
    precipitation rate (mm/hr)

Wind speed is a vector value, having both magnitude and direction. Water type is an indication of whether the conditions at a given location are rainy, snowy, icy, etc. As explained below, although simulators 12a–12d each require location values, they may require different weather values.

Radar reflectivity can be used to derive liquid water content, and it is possible that database 11 could already store liquid water content values. For this reason, radar reflectivity values and liquid water content values are both referred to herein as "liquid water content" values.

Database 11 can be collected by known means of acquiring weather-related data. For example, radar reflectivity values can be generated from weather radar output. Satellite-based earth observing weather systems are a source of remotely sensed atmospheric data. It is also possible that database 11 could be comprised of a combination of real-world and artificially derived parameters.

Figure 3:
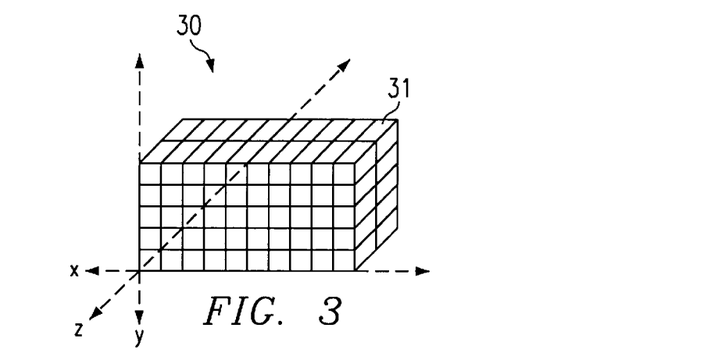
FIG. 3 illustrates a portion of a geographic area whose weather data is stored in the unified weather database of FIG. 1.

FIG. 3 illustrates a portion of a dataspace 30, which is comprised of weather data for a geographic area. Dataspace 30 is a three-dimensional array of volume data elements 31, and is oriented with respect to earth-referenced coordinates, x,y,z. Although not explicitly shown in FIG. 3, the position and wind coordinates of each data element 31 are at a specific x,y,z point in that data element 31, such as at its centerpoint. Spacing of data elements 31 is typically non-uniform (by dithering) to provide spatial variation.

A typical dataspace 30 might represent a real-world area of 800×800 nautical miles. This area might be divided into 2048 data elements 31 in the x and y directions, and 15 layers in the z direction.

The location values of dataspace 30 need not represent the real-world location where the weather actually occurred. It is only necessary that the order and spacing of the data elements 31 be known so that they can be located in the coordinate system of simulator 12. However, a feature of the invention is that a real-world location of dataspace 30 could be mapped to a real-world location depicted by the simulator 12.

Weather Effects Data for Image Generators

In general, for image generators 12a, weather effects generator 10 provides a display list of data elements, which are prioritized according to field-of-view data provided by simulator 12a. The data elements are those that affect the visual display, which may be a visible light display or an infrared display.

User interface 13 receives various types of input from a user to control the display. Two types of data that are significant to the invention may be user-supplied. One type of such data is threshold data, which permits the user to specify a threshold for one or more of the weather parameters of database 11. For example, the user may specify that only liquid water content values over a certain threshold value are significant. Another type of input data is illumination data, such as time-of-day and day-of-year that are used to determine the visual effect of sunlight or moonlight. The processing of both types of data is explained below in connection with preprocessor 14.

Preprocessor 14 is programmed to create a weather database 15 from the source data 11. More specifically, preprocessor 14 performs the tasks of subsampling, thresholding, calculating liquid water content, feature calculations, coordinate transformation, and dithering. As explained below, different simulators may call for different feature calculations.

Subsampling is an optional step, which reduces the amount of data within database 11 to be processed. For example, every n data elements 31 in each direction might be transformed into a larger data element that represents the same area. For convenience of description herein, sub-sampled data elements are also referred to as data elements 31. To preserve as much information as possible, various interpolation or averaging techniques may be used to obtain new parameters from those of the subsampled data elements 31.

Thresholding is another optional step for reducing the amount of data to be processed. A threshold value is specified for one or more parameters in database 11. For example, radar reflectivity is indicative of cloud formation, and any data element 31 whose value is below a given threshold is assumed to be clear sky and not further processed. The default value for thresholding is zero.

For each data element 31, preprocessor 14 calculates its liquid water content, R, from its reflectivity value. An example of such as calculation is:

$$R = \frac{10^{refl/16/0}}{27.4248}, \quad (1)$$

where refl is the reflectivity value for the data element 31.

Figure 4:
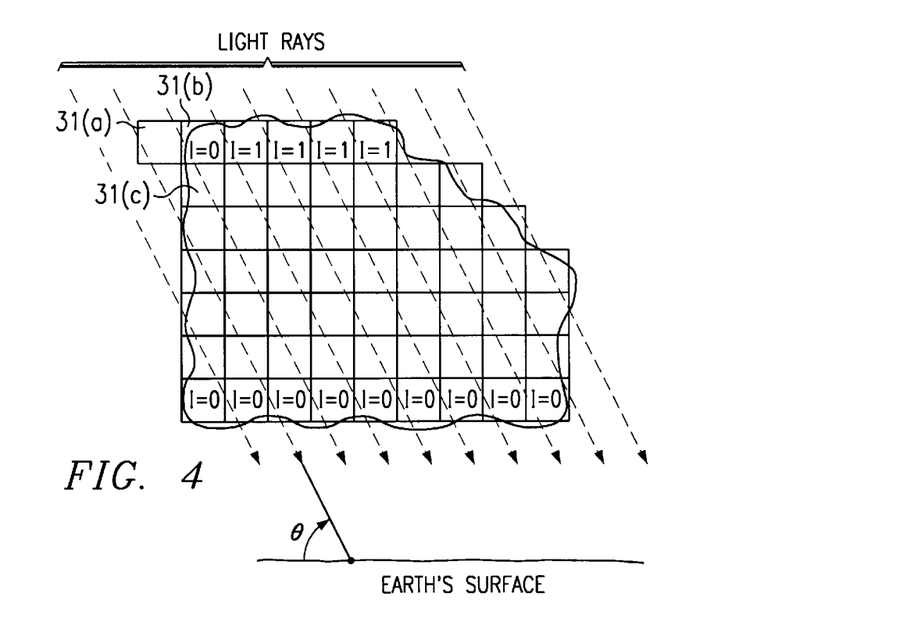
FIG. 4 illustrates a portion of the dataspace of FIG. 3, whose data elements represent a cloud formation illuminated by the sun.

FIG. 4 illustrates a portion of dataspace 30, in two-dimensions. In the example of FIG. 4, thresholding is performed with respect to liquid water content. Each data element 31 is either in a cloud or not, as determined by its liquid water content value. Thus, for example, where data element 31(a) has a liquid water content value of zero, it is assumed to be clear sky and is not processed. Data element 31(b) has a liquid water content value greater than zero, but this value does not exceed the threshold. Thus, data element 31(b) is treated as clear sky and not processed. Data element 31(c) has a liquid water content that is above the threshold. The boundaries of that data element 31(c) and of all other data elements 31 whose liquid water content values exceed the threshold, define the boundaries of the cloud to be visually displayed. These are the data elements 31 that are further processed after thresholding.

For coordinate transformation, the location values of the data elements 31, as well as their wind vector coordinates, are transformed into whatever coordinates are used by the simulator 12a. For example, to make the data consistent with flight training systems, transformation is to north-east-down (N-E-D) coordinates. In the N-E-D system, sea level is at a down of zero and altitude is in negative units. North corresponds to a heading of zero degrees and east corresponds to a heading of ninety degrees. As a result of transformation, dataspace 30 is placed in the vicinity of the viewer and is correctly oriented.

For visible light displays, feature calculations are directed to transparency and color. These calculations include calculations involving illumination and intensity. Illumination calculations assume all light to be from a point source, whose radiation is modelled as parallel rays. This point source is typically the sun or the moon. In the example of this description, the point source is the sun. Sun-angle data (time-of-day and day-of-year) determine the angle of the sun with respect to a plane representing the earth's surface. This sun-angle data may be provided by a user via interface 13, or may be automatically provided by timing unit 26. Dataspace 30 is assumed to be oriented on a plane parallel to the earth's surface. Referring again to FIG. 4, the sun-angle data have been used to calculate an angle, θ, between the light rays and the plane of the earth. For each data element 31, it can be determined whether other data elements 31 are interposed between that data element 31 and the sun.

Each data element 31 is assigned an intensity value by first calculating an illumination value, Ilm, that is a product of the illumination value of a data element 31 blocking the sunlight and a liquid water content factor. An example of this calculation may be expressed as follows:

$$Ilm_{n+1} = Ilm_n\left(1 - \frac{R_{n+1} - R_{min}}{R_{max} - R_{min}}\right), \quad (2)$$

where n+1 identifies the data element 31 whose value is currently being calculated and n identifies a data element 31 immediately interposed between the sun. The $R_{max}$ and $R_{min}$ values are user-defined minimum and maximum values. As an example, they may be specified as follows:

$$R_{min} = \frac{1}{27.4248} \quad (3)$$

$$R_{max} = \frac{10^{65/16}}{27.4248}. \quad (4)$$

In this example, $R_{max}$ is a constant based on a radar reflectively value of 65 DB, which is a reasonable maximum water content value for rain. The result of the above calculation is an attenuated illumination value that is based on the extent to which illumination of any data element 31 is attenuated by the water content of data elements 31 between it and the sun.

The Ilm value of each data element 31 is used to calculate its intensity value, Int, as follows:

$$Int = (Ilm*L_B)(1-L_A)+L_A, \quad (5)$$

where $L_B$ and $L_A$ are user-defined light brightness and light ambience values.

In the example of this description, to facilitate computer calculations, all values are normalized on a scale of 0–1. The intensity value, Tnt, also will be a value ranging from 0–1.

FIG. 4 shows intensity values of some data elements 31. In general, those data elements 31 that represent a part of the cloud that faces the sun are bright. Data elements 31 that represent a part of the cloud directly opposite the sun are dim. "Bright" and "dim" intensity values are 1 and 0, respectively. All other data elements 31 would have values ranging from 1 to 0.

As a result of the above intensity calculations, if the viewer's line of sight passes through a cloud, the effect of attenuation will be seen. The amount of attenuation at a given data element 31 is related to the amount of water in the volume of other data elements 31 that a light ray must pass through to arrive at the given data element 31.

Each data element 31 is assigned a color value and a transparency value. For purposes of this example, a 32-bit value for each data element 31 is assumed, with 8 bits for each RGB (red, green blue) color value and 8 bits for a transparency value, A. Each data element 31 is initially assigned the same base color value and base transparency value. These base values are user-defined and are normalized on a scale of 0–1. Thus, for RGB values that range from 0–255, color values are scaled from 0–1. As an example, where the base color and transparency values are both 0.5, each data element's intensity value is multiplied by 0.5, resulting in color and transparency values ranging from 0–1.

For an infrared image generator 12a, feature calculations are directed to transparency and intensity. As in the case of visible light displays, transparency is a function of liquid water content along the line of sight, which in this case is the line of sight of the infrared detector. The water attenuates the signal received at the infrared detector. Attenuation is also a function of the characteristics of the infrared detector. The amount of attenuation determines a transparency value at each data element 31. Intensity is a function of the radiance emitted along the detector's line of sight. The radiance emitted at each data element is determined by temperature and liquid water content values for a given frequency band. Transparency and intensity values can be calculated by preprocessor 14 or by data handler 17. Alternatively, weather effects generator 10 can deliver the underlying data (liquid water content and temperature) to simulator 12a. For rasterization, the intensity values are mapped to monochromatic color values so that the display looks like a conventional infrared display. Like the intensity and transparency feature calculations, the rasterization can be performed by weather effects generator 10 or the underlying feature data can be delivered by weather data generator 10 to image generator 12a.

For either visible light displays or infrared displays, dithering reduces the occurrence of visual artifacts in an image. A randomized offset is applied to the three-dimensional location of each data element 31.

The weather database 15 generated by preprocessor 14 consists of data elements 31, each described by all or some of the following parameters. Each type of simulator 12a–12d receives location data. The weather effect parameters in database 15 depend on the type of simulator 12a–12d to which data is being provided.

wind speed (north, east, down) (ft/sec)
location (north, east, down) (ft)
radar reflectivity (DBz)
intensity (0–1)
color (0–1)
transparency (0–1)
pressure (mB)
temperature (K)
liquid water content (g/m³)
water type (fog, hail, rain, etc)
precipitation rate (mm/hr)

Database 15 consists of spatially and temporally linked files that are retrieved and loaded into active memory as needed by simulator 12a during image generation. The database 15 is "four-dimensional" in the sense that it represents weather conditions in a three-dimensional volume over time. It is structured in a gridded Cartesian format. Database 15 is "unified" in that it permits a common numerical description of real-world weather, which may be shared among different simulators or among simulation subsystems of a multi-function simulator.

Simulator interface 16 receives field-of-view data from simulator 12a. As explained below, this data is used to determine a field-of-view within dataspace 30. If the viewpoint of simulator 12a is in motion, the field-of-view data is continually updated.

Data handler 17 retrieves data from database 15 and field-of-view data from interface 16. In general, data handler 17 performs the operations necessary to generate a prioritized display list of data elements 31 that are in the current field-of-view. This display list is used by simulator 12a to generate a display that appears three-dimensional. Data handler 17 is scheduled by timing signals to assure periodic image updates and synchronization with simulator 12a.

For display list generation, data handler 17 accesses database 15 and operates on each data element 31 individually. It performs several operations with respect to each data element 31: culling, sorting, graphics primitive assignment, and depth bin assignment.

Culling determines what data elements 31 are in the current field-of-view of simulator 12a. Each data element 31 is considered to determine whether it is between a near clipping distance and a far clipping distance. Those that are within this range are further considered to determine whether they are within an up-down and left-right range with respect to a two-dimensional image frame.

Culling operations may be performed with vector projection techniques, using a viewpoint vector, VP, as a reference. If the viewpoint changes, the culling process is updated. If a data element 31 is not in the field-ofview, further processing need not be performed.

Figure 5:
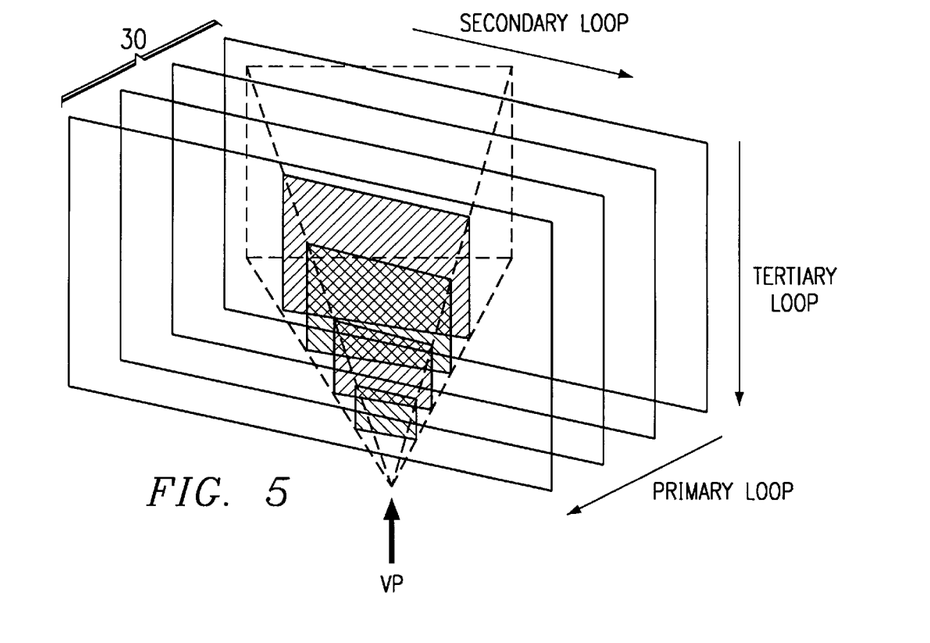
FIG. 5 illustrates a field-of-view within a dataspace.

FIG. 5 illustrates dataspace 30 as a series of transparent planes. The field-of-view is illustrated by dashed lines. The intersection of dataspace 30 and the field-of-view determines which data elements 31 are within the field-of-view.

For sorting, data handler 17 determines how to traverse the database 15 so that the data elements 31 are accessed in an order that is based on the distance between the data element 31 and the viewpoint. Data elements 31 that are closest to the viewpoint are processed first.

As an example of one method of sorting, data elements 31 that are within the field-of-view are sorted by means of three nested loops. The primary sort is back-to-front, and the secondary sorts are left-to-right and top-to-bottom. Of course, the order of the primary sort could be front-to-back, with the "beginning" of the list at its end. In either case, the primary sort is by depth. The order of the secondary sorts could be right-to-left or bottom-to-top.

FIG. 5 illustrates a back-left-top priority of sorting. The first sort orders the data in back to front order, a second orders it left to right, and a third orders it top to bottom. Other sorting methods could be used, with the result being a prioritized list of data elements 31, based on their location in the field-of-view, from which each data element 31 can be accessed according to its depth and from which all data elements 31 of the same depth can be accessed.

Figure 5A:
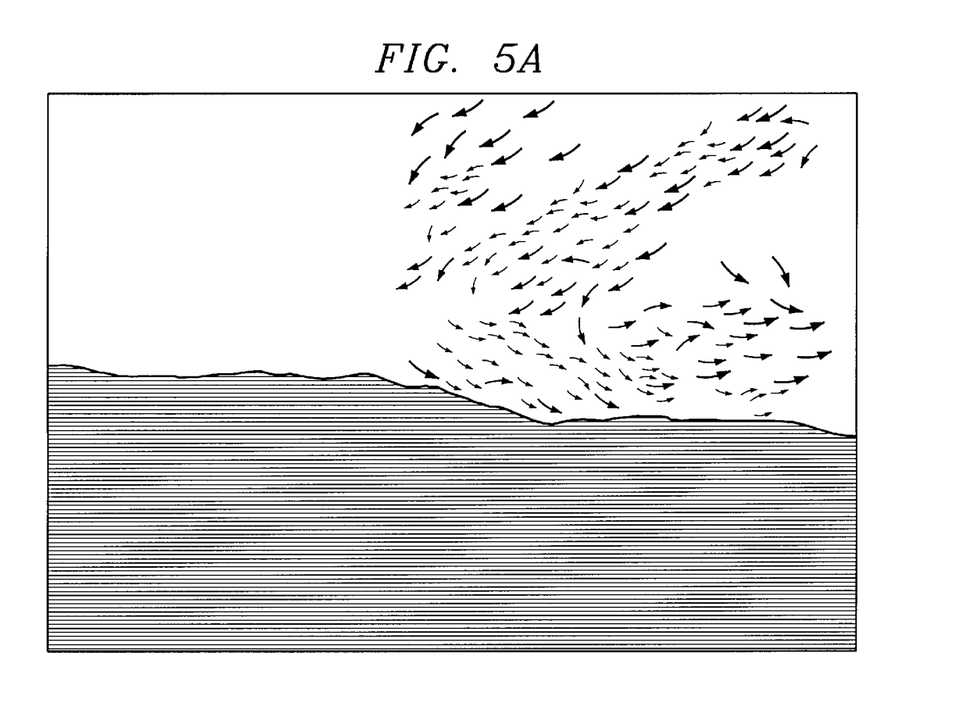
FIG. 5A illustrates the spatial distribution of culled and sorted data elements.

FIG. 5A illustrates the spatial distribution of the culled and sorted data elements 31. Each data element 31 is illustrated in accordance with its wind vector. Only those data elements 31 having a liquid water content above a threshold have been illustrated, and are those data elements 31 that will be represented as clouds. The data elements 31 are drawn in perspective, such that data elements 31 that are closer are larger and more widely spaced.

A next step of display list generation is the assignment of a graphics primitive to each data element 31. One type of graphics primitive that may be assigned to the data elements 31 is a polygon-based primitive known as a "splat". In mathematical terms, a splat is a three-dimensional point spread function about the data element 31. A resulting two-dimensional splat shape is assigned to each data element 31, based on a transformation of that data element's wind vector onto the image plane.

More specifically, the three-dimensional point-spread function applied at each data element 31 is implemented as a three-dimensional ellipsoid, such that the longest axis through the ellipsoid is coincident with the direction of the associated wind vector. The splat shape varies from round to elliptical depending on the magnitude of the wind vector. The greater the wind speed, the more elliptical the splat. The length of the longest axis is determined by the magnitude of the wind vector and a scale factor. The lengths of the other two axes are set to some value that is a portion of the length, typically one-half. During image generation, the ellipsoid, oriented along the wind vector, is projected onto the image plane as a two-dimensional ellipse. As the viewpoint vector changes, the ellipse is rotated so that it maintains a desired relationship between its wind vector and the viewpoint vector.

Figure 6A:
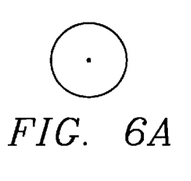
FIGS. 6A–6C illustrate three splats.
Figure 6B:
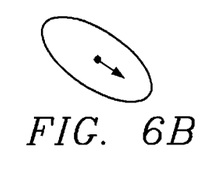
Figure 6C:
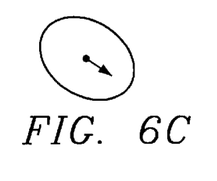

FIGS. 6A–6C illustrate three different splats. The data element 31 whose splat is illustrated in FIG. 6A has a wind vector value of zero, thus its splat is round. The data element 31 whose splat is illustrated in FIG. 6B has a higher wind velocity value than the data element 31 whose splat is illustrated in FIG. 6C. The data elements 31 whose splats are illustrated in FIGS. 6B and 6C have wind vectors in the same direction. It should be understood that FIGS. 6B and 6C are two-dimensional representations of a three dimensional wind vector, thus the wind vector's apparent magnitude is a projection of the true vector into the view area.

After each splat is constructed, it is colored and illuminated according to the parameters of its associated data element 31. The illumination is determined by the transparency value, alpha, calculated during preprocessing. A maximum alpha value, typically the same as the transparency value, is set for the center of the splat shape. The edges of the splat have zero alpha values. Each splat has alpha values that vary across it as a Gaussian function, with the largest value in the center and tapering to a zero value at the edges.

The splat shape along with its varying alpha function is the "footprint" of the particular splat. For perspective imaging, the footprint for the splat of each data element 31 is scaled by its distance from the viewpoint. Thus, splats that are farther away from the field-of-view origin will appear smaller.

Another type of graphics primitive that may be assigned to the data elements is a "billboard". Like splats, billboards are polygon-based primitives, but have a rectangular shape. Like a splat, its shape and orientation are determined by the wind vector.

Figure 9:
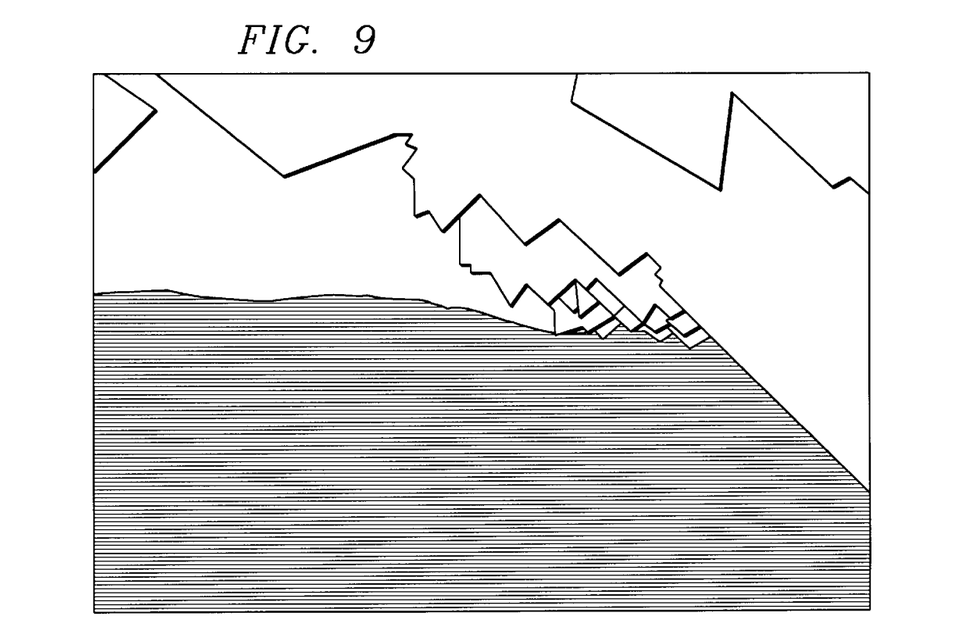
FIG. 9 illustrates a viewing plane covered with billboard-type graphics primitives.

FIG. 9 illustrates how billboards are used to cover the image plane. Each billboard is aligned with the wind vector of the associated data element 31. In a manner similar to that used for splats, billboards are assigned to data elements 31 in front to back order, beginning at one end of the prioritized display list. The billboards are used to cover the image plane in one or more depth bins. Once billboards are assigned, image generation occurs in back to front order.

Billboards are used in conjunction with a texture library. A specific texture is assigned to each billboard, as determined by a look-up table or other reference. Textures are determined by parameters of the data element 31. For example, for an infrared display, a two-dimensional look-up table might have values derived from liquid water content and wind speed. In simpler embodiments, infrared textures might be based only on liquid water content.

Figure 10:
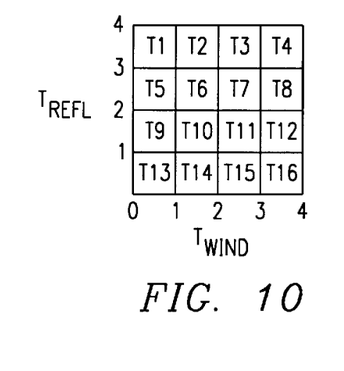
FIG. 10 illustrates how parameters of data elements are mapped to textures for graphics primitives.

FIG. 10 illustrates a two-dimensional texture look-up table having 16 textures, which are selected in accordance with wind and liquid water content parameters. For each data element 31, a wind texture value, $T_{wind}$, is determined as follows:

$$T_{wind}=(W-W_{min})(K_A)+K_B, \qquad (6)$$

where W is the magnitude of the wind vector of that data element 31 and $W_{min}$ is a user-defined wind threshold. $K_A$ and $K_B$ are user-defined constants, which limit the texture values to a predetermined range, here 1–4. A reflectivity texture value, $T_{Refl}$ is determined as follows:

$$T_{Refl}=(R-R_{min})(C_A)+C_B, \qquad (7)$$

where R is the reflectivity value of the data element 31 and $R_{min}$ is a user-defined threshold. $C_A$ and $C_B$ are user defined constants, which limit the texture values to a range of 1–4.

For a data element 31 whose texture values were $T_{wind}$=2.5 and $T_{refl}$=3.5, texture T3 would be assigned to the billboard for that data element 31. The range of values for each texture type corresponds to the number of available textures, here 4×4. High wind and reflectivity values are associated with rain-type textures, such as T4. Low values are associated with clearer textures, such as T13.

Other textures could be derived from other parameters, such as pressure and temperature. As an example, temperature and pressure could be considered ambient, such that different look-up tables could be used for different pressure and temperature ranges.

Texture levels of detail are maintained in the library to support viewing resolution as a function of the location of weather data elements 31. Data elements 31 closer to the viewpoint are mapped with higher detail textures than those that are far away. Thus, the look-up table could be three-dimensional, with the third dimension being a range value.

Other than their rectangular shape and texture, billboards are processed in the same manner as described above for splats. Textures have alpha values that are blended as described above. Like splats, billboards are rotated so that they are always normal to the viewpoint vector, VP.

After graphics primitives are assigned, each data element 31 is considered for filling "depth bins", which facilitates the rendering of three-dimensional aspects of the image. For this task, the field-of-view is first divided into "viewing bins".

Figure 7:
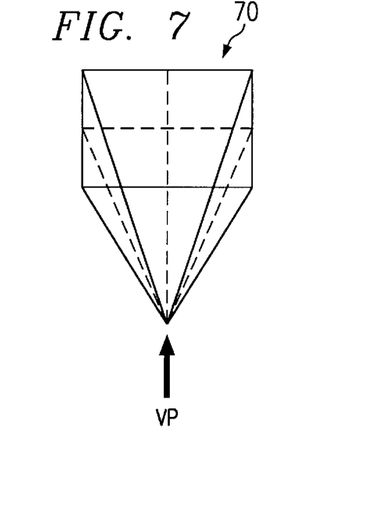
FIG. 7 illustrates how the field-of-view is divided into viewing bins.

FIG. 7 illustrates how the field-of-view is divided into "viewing bins", projected to the viewing plane 70. In this example, there are four viewing bins, but any number could be used. In general, the more viewing bins, the more realistically the image can be rendered.

Each viewing bin is "covered" by locating splats, sorted by distance, on the viewing plane and determining whether the area of the viewing bin is covered. Splats whose data elements 31 are closest to the field-of-view origin have the highest priority. A front-to-back traversal through the database 15 is performed to cover the viewing bins. In other words, the splats of the "frontmost" data elements 31 are used first, with the covering process being repeated for splats of data elements 31 of increasing depth. Each splat is assumed to be scaled for a perspective view as well as to the dimensions of the display, so that a relationship between the dimensions of each splat and the dimensions of the image plane can be determined.

Figure 8:
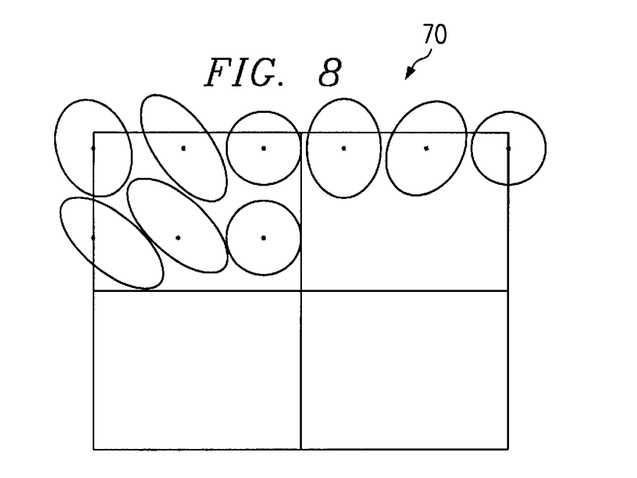
FIG. 8 illustrates a viewing plane with its viewing bins being covered by splat-type graphics primitives.

FIG. 8 illustrates the viewing plane 70, with its viewing bins being covered by a first layer of splats. The splats of the frontmost data elements 31 are being used to cover the viewing bins first. Furthermore, in accordance with a front-top-left, prioritized database traversal, the splats of top data elements 31 are used before bottom ones, etc. The viewing bin in the top left corner is considered "covered" because the splat dimensions cover a certain percentage of its area.

Each viewing bin is covered in the same manner. If a first pass of all data elements 31 of a given depth does not cover the image plane 70, another pass is made with data elements 31 farther away. Each set of splats that covers the image plane once is a set of splats for one "depth bin". This covering process is repeated until the viewing bins have been covered a predetermined number of times or until all data elements in database 15 have been used, whichever occurs first. Splats are added to the display list if they fall into a depth bin that is not full. A depth bin is considered full when it has been covered a predetermined number of times.

The output of data handler 17 is a prioritized display list of data elements 31, each associated with a graphics primitive and a set of data values. This data can be supplied to an image generator component of simulator 12a. For generating a display, the data in the deepest depth bin are used first, then the remaining data, forward through the depth bins. A process generally known as "rasterization" is performed to draw graphics primitives with pixel values. Rasterization techniques, as well as the use of graphics primitives other than splats, are described in U.S. Pat. Ser. No. 08/326601, incorporated by reference above.

Weather Effects Data for Sensor Display Simulators

In general, for sensor simulators 12b, weather effects generator 10 accesses the real-world source data, preprocesses it, and spatially distributes it. It thereby provides data elements 31 that represent either a sensed weather condition, such as water content for a real-beam radar simulator or wind for a simulator that simulates sensed Doppler effects, or a weather condition that affects the sensor. The preprocessing includes tasks similar to those described above in connection with image generator. Preprocessing may include feature calculations specific to the type of sensor, such that the source weather data is used to derive data that would be indicated by the simulated sensor.

For sensor display simulators, data handler 17 spatially distributes the data elements 31 in accordance with the type of sensor. The simulator 12b provides location data, which includes information about the sensor's range (field-of-view). For example, for two-dimensional sensor displays such as a radar display, the data elements are ordered in a two-dimensional plane consistent with the sensor's range.

Figure 11:
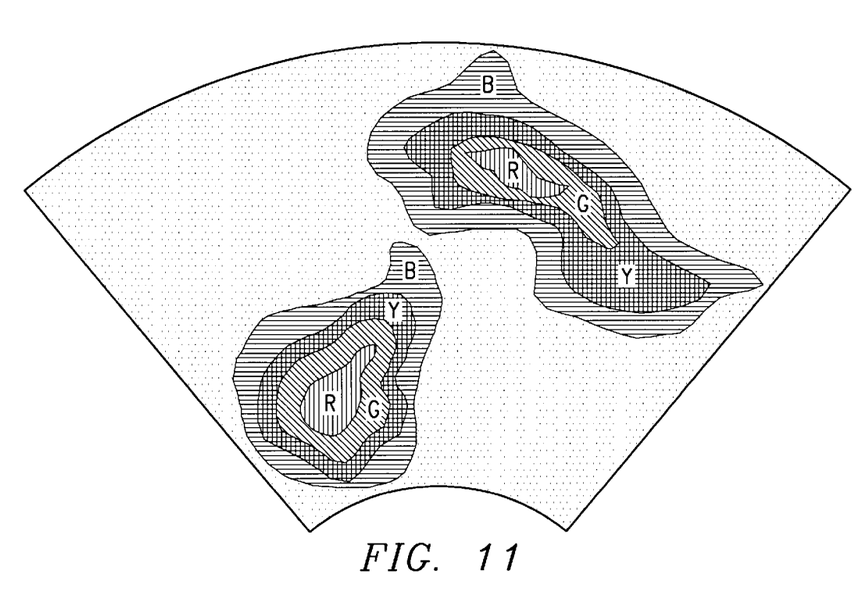
FIG. 11 illustrates a weather radar cockpit display generated by a sensor display simulator with data provided by the weather effects generator of FIG. 1.

FIG. 11 illustrates a radar cockpit display generated by a radar display simulator 12b. The data elements provided by weather effects generator 10 represent water content at a constant elevation, sorted in a two-dimensional plane. The spatial distribution is in terms of azimuthal range bins. For example, in the case of an aircraft radar sensor, the azimuthal distribution of range bins would represent a wedge-shaped field-of-view in front of the aircraft. A continuous-scan ground-based radar sensor might have a circular field-of-view. Simulator 12b uses the liquid water content values to determine the pixel values of the radar display, where different ranges of water content values are represented by different colors.

Figure 12:
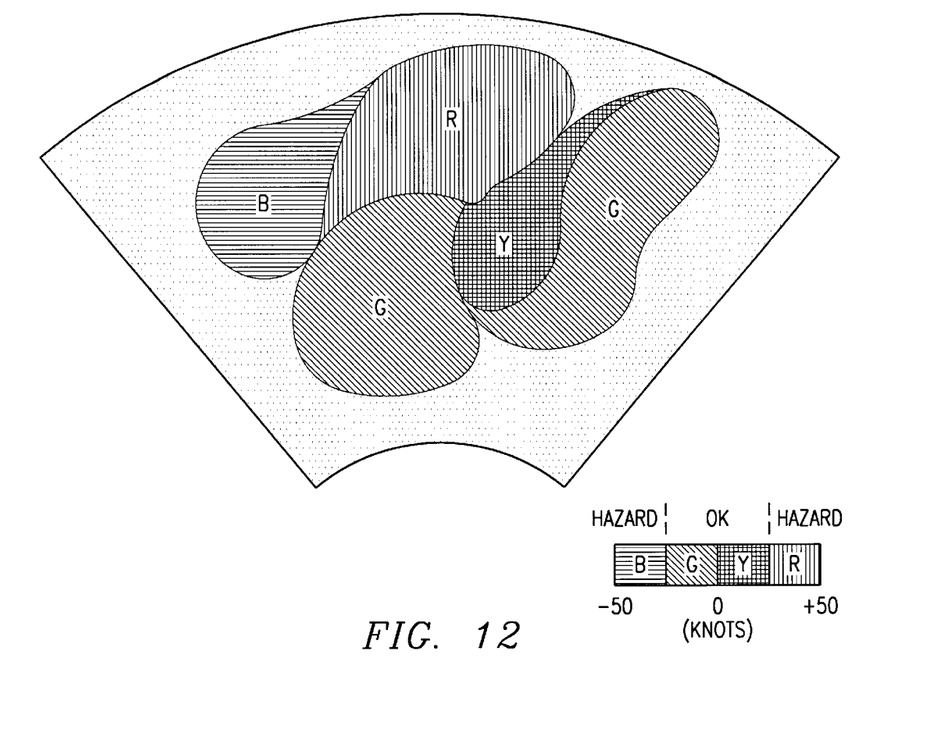
FIG. 12 illustrates a wind display generated by a sensor display simulator with data provided by the weather effects generator of FIG. 1.
Figure 13:
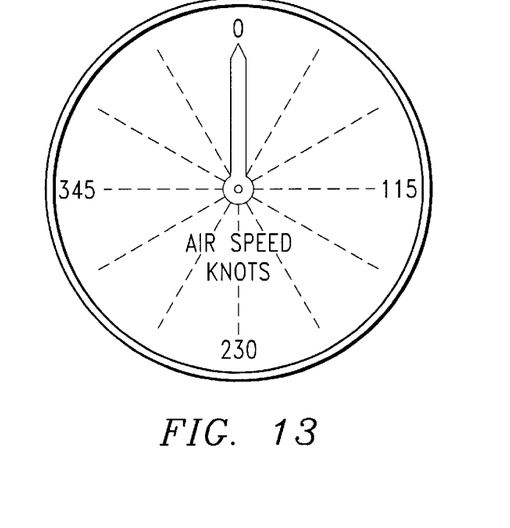
FIG. 13 illustrates an air speed gauge generated by an object simulator with data provided by the weather effects generator of FIG. 1.

FIG. 12 illustrates a wind cockpit display generated by a wind sensor simulator 12b. The data elements provided by weather effects generator 10 represent wind direction and velocity at a specified altitude. These values are used to calculate a wind factor that indicates whether conditions are hazardous. Whereas the display of FIG. 12 is two-dimensional, weather data generator 10 could alternatively be used to provide a prioritized display list for a three-dimensional sensor display. For example, data elements 31 could be provided for a three-dimensional wind display, using the spatial distribution techniques described above in connection with FIGS. 5–7.

Another type of sensor simulator 12b to which weather effects generator 10 might provide data is a target sensor, such as a millimeter-wave radar, infrared sensor, or electro-optical sensor. The ability of these sensors is greatly affected by intervening weather. For such simulators, weather effects generator 10 provides data elements 31 representing weather conditions that cause signal attenuation and clutter. The simulator 12b incorporates the data element values into its processing to calculate radar output as affected by weather related effects such as attenuation and backscatter.

In each of the above examples of sensor display simulators 12b, the spatial distribution of the data elements provided by weather effects generator is determined by the range of the sensor being simulated and also by whether the display is three-dimensional or two. In general, simulator 12b will process the data by dividing it into some arrangement of "spatial elements". These spatial elements might be range bins, such as for radar displays, or doppler bins, such as for wind displays.

Passive and Intelligent Object Simulation

For object simulators 12c and 12d, weather effects generator 10 access the real-world source data, preprocesses data elements 31, and spatially distributes them. It delivers these data elements 31 to the simulator 12c or 12d, which uses them to model the effect of weather on the object. For example, weather effects generator 10 might provide wind, pressure, and temperature data so that the simulation includes the effects of these conditions on the object. For a moving object, this process occurs continuously as the object moves through the environment represented by the database 15.

For a passive object simulator 12c, weather effects generator 10 preprocesses data to determine which data elements 31 surround the object, using location data provided by simulator 12c. Other preprocessing tasks, such as those described above in connection with image generation may be performed.

For object simulation, one type of spatial distribution is interpolation, where weather effects generator 10 interpolates weather values of these data elements 31 at the specfied location. For example, interface 16 might interpolate the eight data elements 31 that comprise a square volume surrounding the object. The result is a net value of the weather conditions acting on the object.

FIG. 11 illustrates an air speed gauge that is part of a simulator 12c that simulates an aircraft in flight. Simulator 12c uses data provided by weather effects generator 10 to calculate the ambient and dynamic pressure at the aircraft.

As another example, a simulator 12c might use data elements 31 from weather effects generator 10 to modify its equations of motion, such as are used to determine speed, attitude, and orientation of the simulated object. This might be interpolated data elements 31 or data elements 31 that are spatially distributed in some other manner.

For spatial distribution other than interpolation, the simulated object may have either a range or a field-of-view. These the two terms are equivalent for purposes of spatial distribution. In either case, weather effects generator 10 receives location data from simulator 12c or 12d, which includes information about the object's range or field-of-view. Weather effects generator 10 uses this data to provide the simulator with data elements 31 that are spatially distributed in a manner appropriate for the sensor. For example, for a simulated object located in a three-dimensional space, the spatial distribution could be three-dimensional in an area surrounding the object.

For simulator 12d, the simulated object is an autonomous agent, which means that it makes intelligent decisions. Weather data generator 10 performs the same basic tasks of accessing the real-world data, preprocessing, and spatial distribution as for passive object simulation. It may provide the same type of data elements 31 as for passive object simulation, but in addition, it provides data elements 31 having values representing weather-related trafficability. This trafficability data may involve feature calculations by preprocessor 14 or data handler 17. For example, accumulation of liquid water content over time can be used to determine how much rain has fallen. Or in the case of a boat, wind might determine the water surface conditions. Such feature calculations are optional in that they may be performed by weather effects generator 10 or weather effects generator 10 may provide the underlying data to simulator 12d. For autonomous objects that "see", visible range is determined with the transparency values that are in the object's field-of-view, and weather effects generator 10 provides a prioritized display list similar to that provided for image generator 12a.

Where simulator 12c or 12d is used with an image generator 12a, the simulated object's behavior is consistent with what is visually displayed. In other words, the data to each type of simulator is from the same real-world weather environment. For example, the simulator might include a visual display of the simulated object undergoing the effects of weather as seen by an observer, for example, a bridge reacting to wind. As stated above, this is an advantage of the unified database 15, which may provide data for different types of simulations.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of using a computer to provide frames of display data representing weather conditions based on real-world weather data, for use in rendering a three-dimensional display comprising the steps of:

accessing a real-world weather database to obtain a three-dimensional set of data elements, each data element having at least a location value and a liquid water content value;

accessing field-of-view data representing a current field-of-view for a current frame;

culling said data elements to determine which are within said field-of-view, to obtain a set of field-of-view data elements;

sorting said field-of-view data elements to form a list of data elements in depth order;

assigning a graphics primitive to each of said field-of-view data elements; and covering an image plane with said graphic primitives.

2. The method of claim 1, wherein said each next frame is generated in real time.

3. The method of claim 1, further comprising the step of calculating an orientation of each said graphics primitive based on said field-of-view data.

4. The method of claim 3, wherein said field-of-view is represented by a field-of-view vector, and wherein said step of calculating an orientation is performed by rotating the plane of each said graphics primitive such that it is substantially normal to said field-of-view vector.

5. The method of claim 1, further comprising the step of calculating a size of each said graphics primitive based on said field-of-view data for said current frame.

6. The method of claim 1, further comprising the step of determining whether a value of said each data element exceeds a threshold, and wherein said culling step and all subsequent steps are performed with respect to those data elements for which said threshold is exceeded.

7. The method of claim 1, further comprising the step of transforming said location values to a coordinate system different from that of said real-world weather database.

8. The method of claim 1, where said field-of-view data is obtained from an external data source.

9. The method of claim 1, further comprising the steps of accessing illumination data representing illumination from a source, and calculating a transparency value for each of said data elements using its liquid water content value and said illumination data.

10. The method of claim 9, wherein said illumination source is the sun and said illumination angle data is sun angle data.

11. The method of claim 9, wherein said step of calculating a transparency value is performed by calculating an intensity value for each data element based on whether its illumination is attenuated by other data elements, and using said intensity value to determine said transparency value.

12. The method of claim 9, further comprising the step of calculating a color value using said liquid water content value and said illumination data.

13. The method of claim 1, wherein each said graphics primitive has one or more pixels.

14. The method of claim 1, wherein each said data element also has a wind vector value and wherein each said graphics primitive has a shape determined by the wind vector value of a data element associated with that graphics primitive.

15. The method of claim 1, wherein each said graphics primitive is an ellipsoid.

16. The method of claim 1, wherein each said graphics primitive is approximated as a rectangle having an assigned texture derived from a data element associated with that graphics primitive.

17. The method of claim 1, further comprising the step of delivering said display list to a simulation system that displays the weather in a viewing field of regard.

18. The method of claim 1, further comprising the step of rasterizing said display list after said prioritizing step.

19. The method of claim 18, wherein said rasterizing step is performed by assigning pixel values to the graphics primitives in the deepest of said depth bins using the transparency values assigned to the data element associated with each graphics primitive, and repeating said assigning step to obtain pixel values for each of said depth bins, in back to front order, such that for each pixel, the transparency value of an underlying pixel is used to derive a pixel value.

20. The method of claim 1, wherein said field-of-view data represents a field-of-view of an observer within said weather conditions.

21. The method of claim 1, wherein said field-of-view data represents a field-of-view of an observer outside said weather conditions.

* * * * *